(12) United States Patent
Sakamoto

(10) Patent No.: US 7,691,935 B2
(45) Date of Patent: Apr. 6, 2010

(54) PROCESS FOR PRODUCING AQUEOUS EMULSION

(75) Inventor: Iwao Sakamoto, Inazawa (JP)

(73) Assignee: Maruyoshi Chemical Co., Ltd, Gifu (JP)

( * ) Notice: Subject to any disclaimer, the term of this patent is extended or adjusted under 35 U.S.C. 154(b) by 821 days.

(21) Appl. No.: 10/546,389

(22) PCT Filed: Feb. 19, 2004

(86) PCT No.: PCT/JP2004/001943

§ 371 (c)(1),
(2), (4) Date: Dec. 1, 2005

(87) PCT Pub. No.: WO2004/074353

PCT Pub. Date: Sep. 2, 2004

(65) Prior Publication Data

US 2006/0106151 A1 May 18, 2006

(30) Foreign Application Priority Data

Feb. 21, 2003 (JP) ............................. 2003-044320

(51) Int. Cl.
*B05D 7/00* (2006.01)

(52) U.S. Cl. ................. 524/522; 524/460; 524/523; 428/391; 428/392; 428/441

(58) Field of Classification Search ................. 524/460, 524/522, 523; 428/391, 392, 441, 442
See application file for complete search history.

(56) References Cited

U.S. PATENT DOCUMENTS

| | | | |
|---|---|---|---|
| 4,240,944 A | | 12/1980 | Temple |
| 5,242,969 A | | 9/1993 | Arpin et al. |
| 5,539,015 A | * | 7/1996 | Horii et al. ............ 523/102 |
| 6,166,118 A | | 12/2000 | Hyche et al. |
| 2003/0176556 A1 | * | 9/2003 | Hagiopol ............ 524/457 |

FOREIGN PATENT DOCUMENTS

| | | |
|---|---|---|
| JP | 54-20057 | 2/1979 |
| JP | 2002-003657 | 1/2002 |

\* cited by examiner

*Primary Examiner*—Peter D Mulcahy
(74) *Attorney, Agent, or Firm*—Wenderoth, Lind & Ponack, LLP

(57) ABSTRACT

A process for producing an aqueous emulsion of a polyolefin having a weight-average molecular weight of 20,000 or higher, characterized in that a styrene/maleic anhydride copolymer or/and an ester of a styrene/maleic acid copolymer is used as a polymer dispersant.

17 Claims, 1 Drawing Sheet

PROCESS FOR PRODUCING AQUEOUS EMULSION

This application is a U.S. national stage of International Application No. PCT/JP2004/001943 filed Feb. 19, 2004.

Technical Field

The present invention relates to an aqueous emulsion and a process for producing the same.

Background Art

Glass fiber reinforced thermoplastics (hereinafter also abbreviated as FRTP) are used for various purposes such as automobile parts (e.g. an engine air duct, etc.) or electronic appliance parts because of their excellent physical properties such as strength and thermal resistance. The above-mentioned FRTP is usually produced from a chopped strand of glass fiber and a matrix resin such as polypropylene, polyamide, and the like. The above-mentioned chopped strand is produced by sizing glass filaments, which are made in a glass fiber spinning process, with an aqueous emulsion as a sizing agent, and cutting the bundle finely.

The sizing performance of the above-mentioned sizing agent depends on the strength of dry melted film formed from aqueous emulsions. Since a polyolefin which has been conventionally used for an aqueous emulsion of polyolefin series has a low molecular weight, and the strength of dry melted film formed is low, the sizing performance has not been satisfactory.

As a process for producing an aqueous emulsion of a high molecular weight polyolefin, there are known, for example, a method that a high molecular weight polyolefin is dissolved in a water-insoluble solvent, an emulsifying agent and water are added thereto to be emulsified, and then the solvent is volatilized, or a method using a water-soluble solvent such as alcohol. However, these methods are not desirable in view of two aspects of high cost and working environment where solvents are used.

Examples of a process for producing an aqueous emulsion of a low molecular weight polyolefin without using a solvent include, for example, a method that a mixture of a polyolefin, an emulsifying agent, and water is heated to a temperature not less than a melting point of the polyolefin in a pressure vessel while keeping water in a liquid state, followed by agitation and emulsification. However, with the use of this method, a high molecular weight polyolefin cannot be emulsified.

In addition, for the purpose of producing an aqueous emulsion of a high molecular weight polypropylene, studies were made on a two stage method that a high molecular weight polypropylene and an emulsifying agent are mixed under melting conditions, a base and water are added thereto, an emulsifying agent is optionally added thereto, and the mixture is agitated under high temperature and high pressure (U.S. Pat. No. 5,242,969), and a method that a modified crystalline polypropylene having a high molecular weight is mixed with a modified non-crystalline polypropylene to produce an aqueous emulsion of a high molecular weight polypropylene (U.S. Pat. No. 4,240,944). However, in these methods, performance such as strength of film formed from emulsion is reduced.

Moreover, there was investigated a method that a high molecular weight polypropylene was mixed with a fatty acid, a hydroxylamine base, a surfactant, and water in a pressure vessel to prepare a mixture wherein solid content is 50 to 90% by mass, and the mixture is heated to a temperature not less than a melting point of the solid with agitation and, after that, hot water was added to the mixture with agitation until the solid content become 5 to 50% by mass to obtain an emulsion (U.S. Pat. No. 6,166,118). However, this method has problems that the production process is long and complicated. In addition, in this method, there is no description that an aqueous emulsion of a polyolefin having a weight-average molecular weight of 80,000 or higher was actually obtained, and it is extremely difficult to satisfactorily disperse a polyolefin having a high molecular weight of 80,000 or higher. Even if such high molecular weight polyolefin is emulsified, most of the polyolefins remain as a fibrous or flat residue due to their insufficient emulsification, resulting in difficult production. Furthermore, there was also investigated a method that a high molecular weight polyolefin was mixed with polyvinyl alcohol and emulsified to produce an aqueous emulsion (JP-A-1979-20057), and this method is, however, not preferable because waterproof of dried film of such emulsion was greatly decreased. Therefore, there has been eagerly desired a method that an aqueous emulsion of a high molecular weight polyolefin is produced industrially advantageously, wherein the process is not complicated and the waterproof of dried film of the emulsion is not greatly decreased.

DISCLOSURE OF THE INVENTION

It is an object of the present invention to provide an aqueous emulsion of a high molecular weight polyolefin which has excellent sizing performance and adhesion property, and a process for producing the aqueous emulsion industrially advantageously.

The present inventors have studied extensively on emulsification of high molecular weight polyolefins. As a result, the present inventors have found that although no advantage is seen in using a high molecular weight acid (e.g. Montanic acid) or a low molecular weight polypropylene modified with an acid for emulsification in view of the molecular weight size, the number of the carboxyl groups, and the addition amount of such acid, in comparison with a fatty acid, it is extremely effective to add, in particular, a small quantity of a low molecular weight polypropylene modified with an acid.

The present inventors have focused on an acid value which is calculated on the basis of a fatty acid, and examined whether or not, for example, a high molecular weight polypropylene modified with an acid (an acid value is about 9 mg KOH/g) should be given with an acid value calculated on the basis of a fatty acid to the extent of a comparatively low molecular weight polyolefin which has been emulsified by conventional methods. As a result of many tests performed, the present inventors could not obtain a homogeneous liquid emulsion in combination with a fatty acid equivalent to a high molecular weight polypropylene acid value of about 15 to 25 mg KOH/g, a nonionic surfactant, and a base. Furthermore, the present inventors have found from the results of many tests that even the most homogenously emulsified solution was in fact a partial emulsion including many fibrous substances, i.e. a part of the high molecular polypropylene in pellet form was emulsified, such polypropylene changed only from granular form to an ellipse or fibrous paste, and thus a homogeneous emulsion could not be obtained.

In addition, the present inventors have found that when a high molecular weight polypropylene in granular form is agitated at a temperature of not less than the melting point, such high molecular weight polypropylene becomes elliptical in the case of low emulsification performance, and when emulsification performance is enhanced by a known method such as addition of an emulsifying agent, elliptic form changes to fibrous form, and further to fine fibrous form. Based on these results, the present inventors have also found that when a test wherein the agitation power is considerably strengthened is carried out under the composition of the above-mentioned fine fibrous form, such fine fibrous form remains as fibrous ball form without fragmentation. Moreover, the present inventors have found that when a fatty acid and a nonionic surfactant are blended with a high molecular weight polypropylene, the degree of change to fine fibrous form becomes larger and, however, even if the degree of such change becomes larger, the product obtained in the test using a fatty acid and a nonionic surfactant is an incomplete emulsion at the stage before atomization, and thus the emulsification failure is not caused by only insufficient mechanics such as agitation power. Furthermore, the present inventors also examined the use of polyacrylic acid/styrene acryl copolymer or ethylene/acryl copolymer as the above-mentioned polymer dispersant and, however, emulsification of resins was not good with regard to dispersant effectiveness as a polymer dispersant.

In addition, the present inventors have studied on many kinds of high molecular weight acids (e.g. polycarboxylic acid, etc.) which are enough to be added in a small amount (% by mass) and are capable of providing much amount of acids without depression of melting point and reduction in melt viscosity. During the studies, the present inventors have found that styrene/maleic anhydride copolymers and styrene/maleic acid copolymer esters are extremely effective.

The present inventors have studied extensively on aqueous emulsions of high molecular weight polyolefins, and have repeated various experiments thereon. As a result of said studies, the present inventors have found that in the production of an emulsion of a high molecular weight polyolefin having a weight-average molecular weight of 20,000 or higher, a satisfactory aqueous emulsion can be produced with the use of a styrene/maleic anhydride copolymer or/and an ester of styrene/maleic acid copolymer as a polymer dispersant. Moreover, the present inventors have found that the above-mentioned aqueous emulsion is excellent in fiber sizing performance and adhesion property to a base material, and can be produced industrially advantageously. Thus, the present inventors have found that the present invention can solve the above-mentioned problems at once. In addition, the present inventors have found that a raw material for a sizing agent which has low compatibility with a matrix resin of FRTP is not necessary, or the use amount of raw materials can be reduced by using the above-mentioned aqueous emulsion as a raw material for a sizing agent for glass fibers.

Furthermore, after the present inventors obtained those various findings, they have further repeated studies and completed the present invention.

That is to say, the present invention relates to:

(1) a process for producing an aqueous emulsion of a polyolefin having a weight-average molecular weight of 20,000 or higher, wherein a styrene/maleic anhydride copolymer or/and an ester of a styrene/maleic acid copolymer is/are used as a polymer dispersant, (2) a process for producing an aqueous emulsion, wherein a polyolefin having a weight-average molecular weight of 20,000 or higher, a styrene/maleic anhydride copolymer or/and an ester of a styrene/maleic acid copolymer, an emulsifying agent, a base, and water are heated to not lower than the melting point of the polyolefin having a weight-average molecular weight of 20,000 or higher, followed by mixing, (3) the process for producing the aqueous emulsion according to the above (2), wherein a low molecular weight polypropylene modified with an acid, having a weight-average molecular weight of 1,000 to 20,000, is heated to not lower than the melting point of the polyolefin having a weight-average molecular weight of 20,000 or higher, together with the polyolefin having a weight-average molecular weight of 20,000 or higher, the styrene/maleic anhydride copolymer or/and the ester of styrene/maleic acid copolymer, the emulsifying agent, the base, and water, followed by mixing, (4) the process for producing the aqueous emulsion according to the above (2) or (3), wherein heating and mixing are performed in a sealed system, (5) an aqueous emulsion comprising a polyolefin having a weight-average molecular weight of 20,000 or higher, a styrene/maleic anhydride copolymer or/and an ester of a styrene/maleic acid copolymer, and water, (6) the aqueous emulsion according to the above (5), further comprising a low molecular weight polypropylene modified with an acid and having a weight-average molecular weight of 1,000 to 20,000, (7) a coating liquid comprising the aqueous emulsion as defined in the above (5) or (6), and (8) the coating liquid according to the above (7), which is a sizing agent for glass fibers.

BEST MODE FOR CARRYING OUT THE INVENTION

Figure 1:
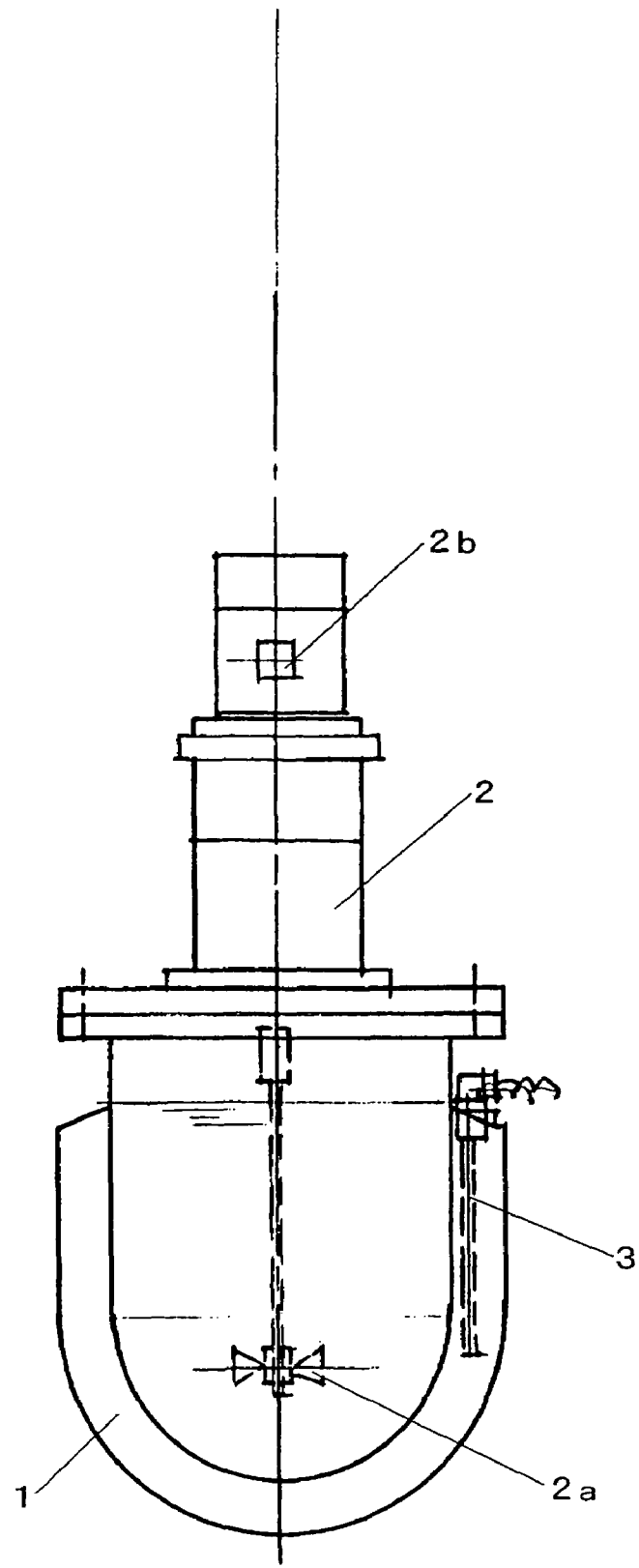
FIG. 1 shows a schematic diagram of a pressure vessel equipped with an agitator and a heater which are preferably used for production process of the present invention. In the figure, numeral 1 shows a pressure vessel, numeral 2 shows an agitator, numeral 2a shows a blade, numeral 2b shows an agitating motor, and numeral 3 shows a heater.

The present invention relates to a process for producing an aqueous emulsion of a polyolefin having a weight-average molecular weight of 20,000 or higher, wherein a styrene/maleic anhydride copolymer or/and an ester of a styrene/maleic acid copolymer is used as a polymer dispersant. Moreover, the present invention relates to an aqueous emulsion comprising a polyolefin having a weight-average molecular weight of 20,000 or higher, a styrene/maleic anhydride copolymer or/and an ester of a styrene/maleic acid copolymer, and water, or further comprising a low molecular weight polypropylene modified with an acid, said polypropylene having a weight-average molecular weight of 1000 to 20,000. Such an aqueous emulsion may be any one so long as a polyolefin having a weight-average molecular weight of 20,000 or higher is dispersed in an aqueous medium. Furthermore, the emulsion may contain an emulsifying agent or/and a salt. There is no particular limitation for viscosity or transparency of the above-mentioned aqueous emulsion, and it is, however, preferable that the emulsion has low viscosity. According to the present invention, such an aqueous emulsion can be produced industrially advantageously.

The polyolefin having a weight-average molecular weight of 20,000 or higher, which is used in the present invention, may be any one so long as it has a weight-average molecular weight of 20,000 or higher and is an olefin polymer. The lower limit of a weight-average molecular weight of such polyolefins used in the present invention is usually about 20,000, and it is, however, preferably about 50,000. The upper limit of a weight-average molecular weight of a polyolefin is not critical but usually around 2,000,000, and preferably about 150,000. In addition, in the present invention, the polyolefin having a weight-average molecular weight of 20,000 or higher may contain a polyolefin having a weight-average molecular weight of 20,000 or lower.

Examples of the kind of polyolefins having a weight-average molecular weight of 20,000 or higher include one or two or more members selected from polyethylene, polypropylene, polybutene, ionomer, copolymer thereof, and modified polymer thereof. The above-mentioned copolymer may be a random copolymer, an alternating copolymer, a graft copolymer, or a block copolymer. The above-mentioned modified polymer may be a product by acid modification or rubber modification. The above mentioned polyolefin is widely circulated in the market, and such a commercially available product can be used preferably in the present invention. A blending ratio of the above-mentioned polyolefin in the present invention is preferably about 10 to 60% by mass to the aqueous emulsion, more preferably about 15 to 50% by mass, most preferably about 20 to 40% by mass.

In addition, the above-mentioned polyolefin is preferably a polypropylene or a modified polypropylene in the present invention. The above-mentioned polypropylene may be any polymer so long as it is a polymer having at least one propylene group. The above-mentioned modified polypropylene may be any one so long as the above-mentioned polypropylene is modified. The above-mentioned modified polypropylene may be also a known modified polypropylene, a polypropylene modified with an acid, a polypropylene modified with a rubber, and a polypropylene modified with a carboxylic acid or derivatives thereof (e.g. a polypropylene modified with maleic anhydride, etc.). In the present invention, it is preferable that the above-mentioned polyolefin having a weight-average molecular weight of 20,000 or higher has a high acid value (e.g. not less than 10 mg KOH/g), resulting in easy emulsification by self-dispersion. Consequently, a polyolefin having a weight-average molecular weight of 20,000 or higher, which is used in the present invention, may be a modified polyolefin such as a polyolefin modified with an acid, and may be also a non-modified polyolefin. In addition, such a polyolefin may be crystalline and may be also non-crystalline.

The above-mentioned polypropylene is widely circulated as a commercial product on the market, and such a commercial product may be used preferably in the present invention. Examples of such a commercial product include, for example, Product Name G3003 which is available from Eastman Chemical Co. (Tennessee, the United States of America) or Product Name Polybond 3200 which is available from Uniroyal Chemical Co. (Connecticut, the United States of America).

The styrene/maleic anhydride copolymer used in the present invention may be any one so long as the ratio of styrene to maleic anhydride (styrene/maleic anhydride) equals 1/1, 2/1, 3/1, etc., i.e., a polymer where the number of moles of styrene is relatively larger or the same compared to that of meleic anhydride. Such copolymer may be a known one called a styrene/maleic an hydride copolymer. In the present invention, the ratio of styrene to maleic anhydride in the above-mentioned styrene/maleic anhydride copolymer may be set appropriately depending on various conditions of the above-mentioned aqueous emulsion or the above-mentioned polyolefin, etc. Moreover, the blending ratio of the above-mentioned styrene/maleic anhydride in the present invention is preferably about 0.1 to 15% by mass relative to an aqueous emulsion, more preferably about 0.3 to 10% by mass, most preferably about 1.0 to 5% by mass.

On the contrary, the ester of a styrene/maleic acid copolymer used in the present invention may be a partial ester such as a half ester. In the present invention, the blending ratio of the above-mentioned ester of the styrene/maleic acid is preferably about 0.2 to 20% by mass, more preferably about 0.5 to 15% by mass, most preferably about 0.75 to 10% by mass, relative to an aqueous emulsion.

Moreover, it is preferable that the above-mentioned ester of the styrene/maleic acid copolymer has strong emulsification performance, it is more preferable that the above-mentioned ester of the styrene/maleic acid copolymer has a stronger affinity or a stronger solvent action for polyolefins than the said styrene/maleic anhydride copolymer, and it is most preferred that the said ester of styrene/maleic acid copolymer is an ester between a styrene/maleic acid copolymer and a higher alcohol (e.g. alcohol having carbon atoms of not less than 6, etc.) or a higher alcohol type non-ionic surfactant where the addition mole number of EO (ethylene oxide) is small (the addition mole number of ethylene oxide is, for example, about 5 to 15).

The above-mentioned higher alcohol may be known in the art, for example, there are exemplified hexanol (e.g. 1-hexanol, 2-ethyl-1-butanol, 4-methyl-2-pentanol, isohexyl alcohol, methyl-1-pentanol, S-hexanol, etc.), heptanol (e.g. 1-heptanol, isoheptyl alcohol, 2,3-dimethyl-1-pentanol, etc.), octanol (e.g. 1-octanol, 2-ethylhexanol, isooctyl alcohol, 2-octanol, 3-octanol, etc.), nonanol (1-nonanol, isononyl alcohol, 3,5,5-trimethylhexanol, etc.), decanol (e.g. 1-decanol, isodecyl alcohol, 3,7-dimethyl-1-octanol, etc.), dodecanol (e.g. 1-dodecanol, isododecyl alcohol, etc.), tridecanol (e.g. isotridecyl alcohol, etc.), C16 alcohol, C18 alcohol, aromatic alcohol (e.g. benzyl alcohol, 2-phenylethanol, 1-phenylethanol, 2-phenyl-1-propanol, p-tolyl alcohol, etc.), alicyclic alcohol (e.g. cyclohexanol, methylcyclohexanol, furfuryl alcohol, tetrahydro-2-furanmethanol, etc.), unsaturated alcohol (e.g. allyl alcohol, hexynol, etc.), or halogenated alcohol (e.g. 2-chlorohexanol, chloroheptanol, etc.), polyethylene glycol, polypropylene glycol, diglycerine, 1,2,6-hexanetriol, trimethylolpropane, trimethylolbutane, pentaerythritol, dipentaerythritol, sorbitol, sorbitan, saccharides, cellulose, and polyvinyl alcohol, etc. In the present invention, the above-mentioned higher alcohol is preferably a liquid or semisolid alcohol at normal temperature, an alcohol having a double bond, an alcohol having a cyclic structure, a weakly hydrophilic or lipophilic alcohol, an alcohol having a straight chain structure, or an alcohol having a high boiling point.

In the case where the above-mentioned styrene/maleic anhydride copolymer and the ester of the above-mentioned styrene/maleic acid copolymer are used concurrently in the present invention, they may be used independently or in combination thereof. The blending ratio may be set appropriately depending on the various conditions of the above-mentioned aqueous emulsion or the above-mentioned polyolefin, etc.

In the present invention, the above-mentioned styrene/maleic anhydride copolymer or/and the above-mentioned ester of the styrene/maleic acid copolymer is/are usually used as a polymer dispersant in order to disperse the above-mentioned polyolefin having a weight-average molecular weight of 20,000 or higher.

An emulsifying agent used in the present invention may be any one so long as the above-mentioned polyolefin can be emulsified or the emulsification of the above-mentioned polyolefin can be enhanced. Examples of the above-mentioned emulsifying agent include, for example, one or two or more agents selected from a fatty acid, a nonionic surfactant, an anionic surfactant, and a cationic surfactant, etc. More specifically, examples of the above-mentioned emulsifying agent include one or two or more agents selected from a fatty acid salt, an α-sulfo fatty acid ester salt, an alkyl benzenesulphonate, an alkyl sulfate salt, an alkyl ether sulfate salt, a triethanolamine alkyl sulfate, a fatty acid diethanolamide, a polyoxyethylene alkyl ether, a polyoxyethylene alkyl phenylether, an alkyl trimethyl ammonium salt, a dialkyl dimethyl ammonuim chloride, an alkyl pyridinium chloride, an alkyl carboxybetaine, etc.

The above-mentioned emulsifying agent is widely circulated as a commercially available product on the market, and such a commercial product may be used preferably as the above-mentioned emulsifying agent in the present invention. Examples of the above-mentioned emulsifying agent include, for example, PERETEX available from Miyoshi Oil & Fat Co., Ltd., and Product Name S-215, S-220, NAA-34, or NAA-222S available from NOF Co., Ltd. Moreover, in the present invention, the blending ratio of the above-mentioned emulsifying agent is preferably about 1.0 to 20% by mass, more preferably about 1.5 to 15% bymass, most preferably about 2.0 to 10% bymass, relative to the amount of the aqueous emulsion. In the present invention, the above-mentioned emulsifying agent is preferably a fatty acid. In order to obtain a particularly excellent emulsion, a nonionic surfactant must exist therein. The role of a fatty acid among the above emulsifying agents is important in the present invention. The fatty acid used as an emulsifying agent in this way has a low molecular weight and a required addition amount is small. Even if the above-mentioned acid value of a polyolefin is small, an excellent compatibility and a solvent action can be attained. For the above-mentioned fatty acid to supply a carboxyl group actively to a resin interface and to reduce high melting viscosity of a resin, a fatty acid which acts strongly to disperse a polyolefin is preferable. As such a fatty acid, preferred is a linear or branched, saturated or unsaturated fatty acid which has a carbon number of not less than 20 and is solid form at normal temperature. In the present invention, the fatty acid is added preferably in an amount enough to give an acid value of not less than about 15 calculated on the basis of a fatty acid, more preferably an acid value of about 15 to 25, relative to the above-mentioned polyolefin. In the present invention, a fatty acid salt (e.g. sodium salt, potassium salt, etc.) may be used instead of a fatty acid, and in this case, a base is not necessarily added thereto. Such a case is also included in the scope of the present invention. Moreover, the above-mentioned emulsifying agent is preferably a nonionic surfactant or/and an anionic surfactant.

Since a low molecular weight polypropylene modified with an acid, which is used in the present invention, is blended appropriately as an optional component depending on qualities such as the molecular weight, the molecular weight distribution of high molecular weight acid-modified polypropylenes to be emulsified, and the acid amount used for such modification, there is no particular limitation for such low molecular weight polypropylene. However, a low molecular weight polypropylene modified with an acid has preferably a weight-average molecular weight of 1,000 to 20,000, and the acid amount for the modification is preferably 1 to 8% by mass. Although there is no particular limitation for an acid to be used for the modification of the above-mentioned polypropylene, examples of such acid include a carboxylic acid. Examples of such carboxylic acid include, for example, an unsaturated carboxylic acid and derivatives thereof, and examples of the above-mentioned unsaturated carboxylic acid include, for example, acrylic acid, methacrylic acid, maleic acid, fumaric acid, itaconic acid, crotonic acid, citraconic acid, sorbic acid, mesaconic acid, and angelic acid, etc. Examples of the above-mentioned derivatives of the unsaturated carboxylic acid include an acid anhydride, an ester, an amide, an imide, and a metal salt, etc., of the above-mentioned unsaturated carboxylic acid, to be more specific, maleic anhydride, itaconic anhydride, citraconic anhydride, methyl acrylate, methyl methacrylate, ethyl acrylate, butyl acrylate, monoethyl maleate, acrylamide, maleic acid monoamide, maleimide, N-butylmaleimide, sodium acrylate, and sodium metacrylate, etc. In the present invention, in order to modify the above-mentioned polypropylene, one or two kinds of the above-mentioned unsaturated carboxylic acids or derivatives thereof may be used solely or in combination thereof. The method for such modification is not particularly limited, and a known method may be used therefor. For example, there are exemplified a method that a polypropylene is dissolved in an appropriate organic solvent, and an unsaturated carboxylic acid or its derivative and a radical generating agent are added to the solution, followed by agitation and mixing, and a method that each component mentioned above is fed to an extruder to perform graft copolymerization. The low molecular weight polypropylene modified with an acid acts effectively on the promotion of action of a surfactant (e.g. a fatty acid, etc.) or styrene/maleic anhydride copolymer, or the reduction in the blending ratio of the styrene/maleic anhydride copolymer. The mass ratio of the low molecular weight polypropylene modified with an acid to the high molecular weight polypropylene modified with an acid is preferably 0.5 to 20% by mass, more preferably 2 to 8% by mass.

A base used in the present invention may be any one so long as a hydroxide ion is generated when the base is ionized in water. Examples of such base include, for example, one or two or more bases selected from ammonia, organic amines (e.g. morpholine, monoethylamine, triethylamine, triethanolamine, etc.) and inorganic alkalis (e.g. sodium hydroxide, potassium hydroxide, etc.), and the like. In the present invention, the blending ratio of the above-mentioned base is usually about 0.4 to 2 in an equivalent ratio relative to the total acid value, preferably about 0.5 to 1.5, or more preferably about 0.6 to 1.3.

The above-mentioned aqueous emulsion may contain other additives. Such other additives may be any one so long as they are those except for the emulsifying agents and the bases mentioned above, and may be a known additive which has been appropriately used. The additive includes, for example, one or two or more additives selected from an antiseptic agent, a defoamer, a polymer stabilizer, an ultra violet ray absorbent, an oxidation inhibitor, an inorganic or organic filler, a heat stabilizer, a flame retardant, a cleanzing agent, a disinfectant, a lubricant, waxes, a colorant, and a crystallization accelerator, etc.

The above-mentioned antiseptic agent may be any one so long as it has an antiseptic action. Examples of such antiseptic agent include one or two or more agents selected from benzoic acid, sodium benzoate, sorbic acid, potassium sorbate, a fermented milk, a lactic acid bacteria drink, sodium dehydroacetate, isobutyl p-oxybenzoate, isopropyl p-oxybenzoate, ethyl p-oxybenzoate, butyl p-oxybenzoate, propyl p-oxybenzoate, propionic acid, sodium propionate, and calcium propionate, etc. The antiseptic agent is not limited to these examples.

The above-mentioned defoamer may be any one so long as it can inhibit the generation of foam. Examples of such defoamer include one or two or more kinds of defoamers selected from a silicon based defoamer, an ester based defoamer, and an ether based defoamer, etc. In the present invention, the blending ratio of the above defoamer is usually preferably about 0.01 to 1.0% by mass to the amount of aqueous emulsion, more preferably about 0.05 to 0.5% by mass, most preferably about 0.1 to 0.3% by mass.

Examples of the polymer stabilizer mentioned above include one or two or more kinds of stabilizers selected from a water-soluble polymer stabilizer, an oil-soluble polymer stabilizer, and an amphiphilic polymer stabilizer. The water-soluble polymer stabilizer may be any one so long as it is a reactant or a stabilizer which is soluble in water-miscible liquid. The above oil-soluble polymer stabilizer may be any one so long as it is a reactant or a stabilizer which is soluble in water-immiscible liquid. The above amphiphilic polymer stabilizer may be any one so long as it is a reactant or a stabilizer which is soluble in water-miscible liquid and oil-miscible liquid. The water-soluble polymer stabilizer, the oil-soluble polymer stabilizer, and the amphiphilic polymer stabilizer may be known in the art.

In addition, the above-mentioned aqueous emulsion can be produced by using the above-mentioned styrene/maleic anhydride copolymer or/and the above-mentioned ester of the styrene/maleic acid copolymer as a polymer dispersant in the present invention. As the production method, there is, for example, exemplified a method wherein the polyolefin having a weight-average molecular weight of 20,000 or higher, the styrene/maleic anhydride copolymer or/and the ester of the styrene/maleic acid copolymer, the emulsifying agent, the base, and the water, etc. are heated and mixed. The heating and mixing may be performed simultaneously. A heating means used for the above-mentioned heating may be any one so long as the above-mentioned aqueous emulsion can be produced. Examples of such heating means may be, for example, an oven and a heater, etc. The heating temperature is not particularly limited so long as the above-mentioned aqueous emulsion can be produced. In the present invention, the temperature is preferably not less than the melting point of the above-mentioned polyolefin having a weight-average molecular weight of 20,000 or higher, more preferably higher by about 5 to 30° C. than the above-mentioned melting point. Moreover, in the present invention, the above-mentioned heating is preferably performed in a sealed system, and a pressure vessel is preferably used for such purpose.

A mixing means used for the above-mentioned mixing may be any one so long as the above-mentioned aqueous emulsion can be produced and such mixing means is, for example, an agitation, a rotation of a vessel, a mixed flow, etc. The above-mentioned agitation may be carried out mechanically or manually, but a mechanical agitation is preferable. In the present invention, the mixing is preferably performed according to the agitation method mentioned above, and is more preferably performed by dispersing homogeneously the polyolefin having a weight-average molecular weight of 20,000 or higher, the styrene/maleic anhydride copolymer or the ester of the styrene/maleic acid copolymer, the emulsifying agent, the base, the water, and optionally the above other additives. Moreover, in the present invention, such mixing is preferably performed in a sealed system, and a pressure vessel is preferably used for such purpose. In the present invention, when a pressure vessel is used, the heating and mixing can be performed simultaneously in the pressure vessel.

Hereinafter, a preferable production process of the present invention shall be explained by way of a drawing.

FIG. 1 shows a schematic drawing of a pressure vessel equipped with an agitator and a heater, which is preferably used in the production process of the present invention. In FIG. 1, the polyolefin having a weight-average molecular weight of 20,000 or higher, the styrene/maleic anhydride copolymer or/and the ester of the styrene/maleic acid copolymer, the emulsifying agent, the base, and the water were placed in a pressure vessel 1. Then, the pressure vessel is sealed and heated up to a temperature of not less than the melting point of the above-mentioned polyolefin with the use of a heater 3. After then, the mixture is agitated with the use of an agitator 2 while maintaining the heating temperature mentioned above. After agitation, the pressure vessel is cooled down to produce an aqueous emulsion. With respect to heating, it is preferable to heat up to a temperature which is higher by about 5 to 20° C. than the melting point of the above-mentioned polypropylene modified with maleic anhydride with the use of the heater 3. After that, the mixture is agitated with the use of the agitator 2 while maintaining such heating temperature. After agitation, the pressure vessel 1 is cooled down to around room temperature (about not higher than 40° C.) with water to produce an aqueous emulsion industrially advantageously.

In the present invention, the ester of styrene/maleic acid copolymer mentioned above is added to the above styrene/maleic anhydride copolymer, the above emulsifying agent, the above base, and the above water to emulsify the above polyolefin having a weight-average molecular weight of about 50,000 to 150,000, thereby to obtain an aqueous emulsion.

The aqueous emulsion produced by the above-mentioned process is used for various purposes because of its excellent sizing performance and adhesion property. Examples of the intended use include a coating liquid, to be more specific, a sizing agent for glass fibers, a wax for floors or cars, a metal coating, a lubricant, a mold release agent for metals, a toner binder, and a heat sealing for glass fibers and polyolefin resins, etc. In the case that the aqueous emulsion is used as the sizing agent for glass fibers, it is preferable to use the emulsion in admixture with a silane coupling agent, etc.

WORKING EXAMPLE 1

To a 3.5 L pressure vessel equipped with an agitator were added once a high molecular weight polypropylene modified with maleic anhydride (MD-353D, random polypropylene, weight-average molecular weight of 60,000, manufactured by DuPont Co., Ltd.); a low molecular weight polypropylene modified with an acid (E-43, weight-average molecular weight of 9,000, manufactured by Eastman Co.); a styrene/maleic anhydride copolymer (SMA#1000A and SMA#3000A, manufactured by Atofina Co., Ltd.); NAA-34 (product name)(purified oleic acid manufactured by NOF Co., Ltd.), NAA-222S (product name)(purified behenic acid, manufactured by NOF Co., Ltd), PERETEX 2920H (product name)(5 mole EO adduct of oleyl alcohol, manufactured by Miyoshi Oil & Fat Co., Ltd.), S-220 (product name) (20 mole EO adduct of stearyl alcohol, manufactured by NOF Co., Ltd), and EPAN U-108 (EOPO copolymer manufactured by Dai-ichi Kogyo Seiyaku Co., Ltd) as an emulsifying agent; potassium hydroxide (reagent level) and morpholine (reagent level) as a base, and water according to the blending ratio in Table 1. The pressure vessel was sealed and heated up to a temperature which is higher by 10 to 25° C. than the melting point of the resin. After heating, the mixture was agitated at the rotation rate of 2000 rpm for 20 minutes while maintaining the temperature. After agitation, the agitation is shifted to reduce the rotation rate. Then, the mixture is cooled down to not higher than 40° C. to produce an aqueous emulsion.

WORKING EXAMPLE 2

Random polypropylene po-1015 (weight-average molecular weight of 120,000, manufactured by Exxon Mobil Chemical Co.) as a high molecular weight polypropylene modified with maleic anhydride; a higher alcohol ester of a styrene/maleic acid copolymer (product made from the above-mentioned SMA manufactured by Atofina Co., Ltd. and behenyl alcohol at reagent level) as an ester of a styrene/maleic acid copolymer; S-215 (product name)(15 mole EO adduct of stearyl alcohol, manufactured by NOF Co., Ltd.) as an emulsifying agent; and potassium hydroxide (reagent level) were added similarly to Working Example 1 except that MD-353D, S-220, and U-108 were not used and the blending ratio was set according to Table 1, thereby to produce an aqueous emulsion.

WORKING EXAMPLE 3

Homopolypropylene G3003 (weight-average molecular weight is 50,000, manufactured by Eastman Chemical Co.) as a high molecular weight polypropylene modified with maleic anhydride; PERETEX 2937J (product name)(22 mole EO adduct of oleyl alcohol, manufactured by Miyoshi Oil & Fat Co., Ltd.) as an emulsifying agent; and potassium hydroxide (reagent level) were added similarly to Working Example 1 except that MD-353D, S-220, and U-108 were not used and the blending ratio was set according to Table 1, thereby to produce an aqueous emulsion.

WORKING EXAMPLE 4

Homopolypropylene (POLYBOND 3200) (weight-average molecular weight of 90,000, manufactured by Uniroyal Co.) as a high molecular weight polypropylene modified with maleic anhydride; a higher alcohol ester of a styrene/maleic acid copolymer (product made from the above-mentioned SMA manufactured by Atofina Co., Ltd. and behenyl alcohol at reagent level) as an ester of a styrene/maleic acid copolymer; erucic acid (a fatty acid, manufactured by NOF Co., Ltd.) and S-215 (product name)(15 mole EO adduct of stearyl alcohol, manufactured by NOF Co., Ltd.) as an emulsifying agent; and potassium hydroxide (reagent level) were added similarly to Working Example 1 except that MD-353D, NAA-34, S-220, and U-108 were not used and the blending ratio was set according to Table 1, thereby to produce an aqueous emulsion.

8 were not at the stage where sufficient emulsification was finished.

TABLE 2

| | Evaluation | Solids content (%) | Viscosity (cps/25° C.) | Average Particle diameter (μm) | Appearance |
|---|---|---|---|---|---|
| Working Example 1 | ◉ | 33 | 120 | 0.09 | Pale brown, semi-transparent |
| Working Example 2 | ○ | 33 | 200 | 0.14 | Milky white/brown |
| Working Example 3 | ○ | 33 | 80 | 0.15 | Milky white/brown |
| Working Example 4 | ○ | 33 | 100 | 0.23 | Milky white/brown |

In the table 2, solids content indicates a non-volatile component. The symbol ○ in the evaluation results indicates homogeneous emulsification having no residue. The symbol ◉ in the evaluation results indicates homogeneous emulsifi-

TABLE 1

| Composition (Product name) | Working Example 1 | Working Example 2 | Working Example 3 | Working Example 4 |
|---|---|---|---|---|
| High molecular weight polypropylene modified with maleic anhydride | | | | |
| MD-353D | 500 (21.7) | — | — | — |
| po-1015 | — | 500 (21.2) | — | — |
| G-3003 | — | — | 500 (21.7) | — |
| 3200 | — | — | — | 570 (22.9) |
| Low molecular weight polypropylene modified with an acid | | | | |
| E-43 | 30 (1.3) | 40 (1.7) | 30 (1.3) | 40 (1.6) |
| Styrene/maleic anhydride | | | | |
| SMA-1000A | 38 (1.6) | 38 (1.6) | 40 (1.7) | 38 (1.5) |
| SMA-3000A | 29 (1.2) | 40 (1.7) | 27 (1.2) | 25 (1.0) |
| Ester of styrene/maleic acid | — | 15 (0.6) | — | 15 (0.6) |
| Fatty acid | | | | |
| NAA-34 | 35 (1.5) | 35 (1.5) | 35 (1.5) | — |
| NAA-222S | 50 (2.2) | 50 (2.1) | 50 (2.2) | 35 (1.4) |
| Erucic acid | — | — | — | 35 (1.4) |
| Nonionic surfactant | | | | |
| 2920H | 15 (0.6) | 15 (0.6) | 15 (0.6) | 15 (0.6) |
| 2937J | — | — | 35 (1.5) | — |
| S-220 | 35 (1.5) | — | — | — |
| S-215 | — | 35 (1.5) | — | 35 (1.4) |
| U-108 | 15 (0.6) | — | 15 (0.6) | — |
| KOH | — | 12 (0.5) | 13 (0.6) | 13 (0.5) |
| Morpholine | 75 (3.2) | 70 (3.0) | 75 (3.2) | 70 (2.8) |
| Water | 1468 (63.7) | 1513 (64.0) | 1468 (63.7) | 1597 (64.2) |

In the table 1, the unit is expressed in terms of part by mass, and the value in the parentheses shows % by mass.

The aqueous emulsions produced in the above Working Examples 1 to 4 were observed and evaluated. The observation results are shown in Table 2. The aqueous emulsions obtained in the Working Examples 1 to 4 did not contain a residue such as flat pellets and fibrous substances, and were all stable. To the contrary, all of Comparative Examples 1 to 8 were not at the stage where sufficient emulsification was finished.

cation having no residue, and good emulsification wherein the particle size is particularly small.

COMPARATIVE EXAMPLE 1

To a 3.5 L pressure vessel equipped with an agitator were added once G3003 (product name)(high molecular weight homopolymer modified with maleic anhydride, manufactured by Eastman Chemical Co.) as a polyolefin; PERETEX 2920H (product name) (5 mole EO adduct of oleyl alcohol, manufactured by Miyoshi Oil & Fat Co., Ltd.), PERETEX 2925H (product name)(10 mole EO adduct of oleyl alcohol, manufactured by Miyoshi Oil & Fat Co., Ltd.), S-215 (product name)(15 mole EO adduct of stearyl alcohol) and NAA-34 (product name)(purified oleic acid, manufactured by NOF Co., Ltd.) as an emulsifying agent; potassium hydroxide (reagent level) and morpholine (reagent level) as a base; and water according to the blending ratio in Table 3. The pressure vessel was sealed and heated up to 170° C. which is higher by 10° C. higher than the melting point of the resin. After heating to 170° C., the mixture was agitated at a high rotation rate of 2000 rpm for 20 minutes while maintaining the temperature at 170° C. After agitation, the agitation is shifted to reduce the rotation rate. Then, the mixture is cooled down to 40° C. with water to produce an aqueous emulsion.

COMPARATIVE EXAMPLE 2

An aqueous emulsion was produced similarly to Comparative Example 1 except that the blending ratio was set according to Table 3.

COMPARATIVE EXAMPLE 3

An aqueous emulsion was produced similarly to Comparative Example 1 except that NAA-222S (product name) (purified behenic acid, manufactured by NOF Co., Ltd.) was further added as an emulsifying agent and the blending ratio was set according to Table 3.

COMPARATIVE EXAMPLE 4

An aqueous emulsion was produced similarly to Comparative Example 3 except that S-220 (product name)(20 mole EO adduct of stearyl alcohol, manufactured by NOF Co., Ltd.) was further added as an emulsifying agent, S-215 was not used, and the blending ratio was set according to Table 3.

COMPARATIVE EXAMPLE 5

An aqueous emulsion was produced similarly to Comparative Example 4 except that E-43 (product name)(low molecular weight homopolypropylene modified with maleic anhydride, manufactured by Eastman Chemical Co.) was further added, and the blending ratio was set according to Table 3.

In the table, the unit is expressed in terms of part by mass, and the value in parentheses shows % by mass.

COMPARATIVE EXAMPLE 6

To a 3.5 L pressure vessel equipped with an agitator were added once a high molecular weight polypropylene modified with maleic anhydride (product name MD-353D, manufactured by DuPont Co., Ltd.) as a polyolefin; PERETEX 2920H (product name) (5 mole EO adduct of oleyl alcohol, manufactured by Miyoshi Oil & Fat Co., Ltd.), PERETEX 2925H (product name)(10 mole EO adduct of oleyl alcohol, manufactured by Miyoshi Oil & Fat Co., Ltd.), S-220 (product name)(20 mole EO adduct of stearyl alcohol), NAA-34 (product name) (purified oleic acid, manufactured by NOF Co., Ltd.), and NAA-222S (product name) (purified behenic acid, manufactured by NOF Co., Ltd.) as an emulsifying agent; potassium hydroxide (reagent level) and morpholine (reagent level) as a base; and water according to the blending ratio in Table 4. The pressure vessel was sealed and heated up to 170° C. which is higher by 10° C. than the melting point of the resin. After heating to 170° C., the mixture was agitated at a high rotation rate of 2000 rpm for 20 minutes while maintaining the temperature at 170° C. After agitation, the agitation is shifted to reduce the rotation rate. Then, the mixture is cooled down to 40° C. with water to produce an aqueous emulsion.

COMPARATIVE EXAMPLE 7

An aqueous emulsion was produced similarly to Comparative Example 6 except that a low molecular weight polypropylene modified with maleic anhydride (product name: E-43, manufactured by Eastman Co.) was further added, PERETEX 2920H and PERETEX 2925H were not used, and the blending ratio was set according to Table 4.

COMPARATIVE EXAMPLE 8

An aqueous emulsion was produced similarly to Comparative Example 7 except that PERETEX 2937J (product name) (22 mole EO adduct of oleyl alcohol, manufactured by Miyoshi Oil & Fat Co., Ltd.) was further added, and the blending ratio was set according to Table 4.

TABLE 3

| Component | Comparative Example 1 | Comparative Example 2 | Comparative Example 3 | Comparative Example 4 | Comparative Example 5 |
|---|---|---|---|---|---|
| G3003 | 500 (26.8) | 500 (26.4) | 500 (26.0) | 500 (26.0) | 470 (24.4) |
| E-43 | — | — | — | — | 30 (1.6) |
| PERETEX 2920H | 18 (1.0) | 10 (0.5) | 10 (0.5) | 10 (0.5) | 10 (0.5) |
| PERETEX 2925H | 18 (1.0) | 10 (0.5) | 10 (0.5) | 10 (0.5) | 10 (0.5) |
| S215 | 36 (1.9) | 36 (1.9) | 36 (1.9) | — | — |
| S220 | — | — | — | 36 (1.9) | 36 (1.9) |
| NAA34 | 75 (4.0) | 100 (5.3) | 75 (3.9) | 75 (3.9) | 75 (3.9) |
| NAA222S | — | — | 36 (1.9) | 36 (1.9) | 36 (1.9) |
| Potassium hydroxide (Reagent level) | 6 (0.3) | 7 (0.4) | 7 (0.4) | 7 (0.4) | 7 (0.4) |
| Morpholine (Reagent level) | 21 (1.1) | 27 (1.4) | 27 (1.4) | 27 (1.4) | 27 (1.4) |
| Water | 1190 (63.8) | 1260 (63.4) | 1220 (63.4) | 1220 (63.4) | 1220 (63.4) |

TABLE 4

| Component (Product name) | Comparative Example 6 | Comparative Example 7 | Comparative Example 8 |
|---|---|---|---|
| Modified crystalline polypropylene having a high molecular weight | 500 (26.0) | 470 (25.1) | 450 (24.4) |
| Modified crystalline polypropylene having a low molecular weight | — | 30 (1.6) | 50 (2.7) |
| PERETEX 2920H | 10 (0.5) | — | — |
| PERETEX 2925H | 10 (0.5) | — | — |
| S-220 | 36 (1.9) | 36 (1.9) | — |
| PERETEX 2937J | — | — | 46 (2.5) |
| NAA-34 | 75 (3.9) | 75 (4.0) | 60 (3.2) |
| NAA-222S | 36 (1.9) | 36 (1.9) | 34 (1.8) |
| Potassium hydroxide | 7 (0.4) | 7 (0.4) | 7 (0.4) |
| Morpholine | 27 (1.4) | 27 (1.4) | 27 (1.5) |
| Water | 1220 (63.4) | 1190 (63.6) | 1170 (63.4) |

In the table, the unit is expressed in terms of part by mass, and the value in parentheses shows % by mass.

The aqueous emulsions produced in the above-mentioned Comparative Examples were observed and evaluated. The observation results are shown in Table 5. With respect to Comparative Examples 5 and 8, milky white coloration was increased due to thermal deformation of the polyolefin (e.g. flat pellets and fibrous substances, etc.), increase of fatty acids, and addition of long chain fatty acids, thereby to cause partial emulsification. In Comparative Examples 1 to 4, 6, and 7, the products were all a paste or a high viscosity liquid containing flat pellets or filaments. However, all of Comparative Examples 1 to 8 were not at the stage where sufficient emulsification was finished.

TABLE 5

| | Solids content | Result |
|---|---|---|
| Comparative Example 1 | 35 | x |
| Comparative Example 2 | 35 | x |
| Comparative Example 3 | 35 | x |
| Comparative Example 4 | 35 | x |
| Comparative Example 5 | 35 | Δ |
| Comparative Example 6 | 35 | x |
| Comparative Example 7 | 35 | x |
| Comparative Example 8 | 35 | Δ |

In the table, solids content indicates a non-volatile component. The symbol x in the evaluation results indicates that the produced emulsions were a paste or a high viscosity liquid containing flat pellets or filaments. The symbol Δ in the evaluation results indicates that the produced emulsions were a partially emulsified liquid containing flat pellets or filaments.

INDUSTRIAL APPLICABILITY

According to the present invention, there can be provided an aqueous emulsion of a high molecular weight polyolefin which has an excellent sizing performance and an adhesion property, and a process for producing the aqueous emulsion industrially advantageously.

The invention claimed is:

1. A process for producing an aqueous emulsion, which consists essentially of heating a polyolefin having a weight-average molecular weight of 20,000 or higher in an amount of about 10 to 60% by mass relative to the aqueous emulsion, a styrene/maleic anhydride copolymer in an amount of about 0.1 to 15% by mass relative to the aqueous emulsion or/and an ester of a styrene/maleic acid copolymer in an amount of about 0.2 to 20% by mass relative to the aqueous emulsion, an emulsifying agent, a base, and water to not lower than the melting point of the polyolefin having a weight-average molecular weight of 20,000 or higher, followed by mixing.

2. A process for producing an aqueous emulsion, which consists essentially of heating a low molecular weight polypropylene modified with an acid and having a weight-average molecular weight of 1,000 to 20,000 to not lower than the melting point of a polyolefin having a weight-average molecular weight of 20,000 or higher, together with the polyolefin having a weight-average molecular weight of 20,000 or higher in an amount of about 10 to 60% by mass relative to the aqueous emulsion, a styrene/maleic anhydride copolymer in an amount of about 0.1 to 15% by mass relative to the aqueous emulsion or/and an ester of a styrene/maleic acid copolymer in an amount of about 0.2 to 20% by mass relative to the aqueous emulsion, the emulsifying agent, the base, and water, followed by mixing.

3. The process for producing the aqueous emulsion as claimed in claim 1, wherein heating and mixing are performed in a sealed system.

4. The process for producing the aqueous emulsion as claimed in claim 2, wherein heating and mixing are performed in a sealed system.

5. The process for producing the aqueous emulsion as claimed in claim 1, wherein the polyolefin having a weight-average molecular weight of 20,000 or higher is a polypropylene or a modified polypropylene.

6. The process for producing the aqueous emulsion as claimed in claim 1, wherein:
the polyolefin having a weight-average molecular weight of 20,000 or higher is a polypropylene or a modified polypropylene, has a weight-average molecular weight of 20,000 to 150,000 and is present in an amount of 15% to 50% by mass relative to the aqueous emulsion,
the styrene/maleic anhydride copolymer is present in an amount of 0.3% to 10% by mass relative to the aqueous emulsion or/and the ester of a styrene/maleic acid copolymer is present in an amount of 0.5% to 15% by mass relative to the aqueous emulsion, and
wherein heating is to 10° to 25° C. above the melting point of the polyolefin having a weight-average molecular weight of 20,000 or higher.

7. The process for producing the aqueous emulsion as claimed in claim 1, wherein:
the polyolefin having a weight-average molecular weight of 20,000 or higher is a polypropylene or a modified polypropylene, has a weight-average molecular weight of 50,000 to 150,000 and is present in an amount of 20% to 40% by mass relative to the aqueous emulsion,
the styrene/maleic anhydride copolymer is present in an amount of 1% to 5% by mass relative to the aqueous emulsion or/and the ester of a styrene/maleic acid copolymer is present in an amount of 0.75% to 10% by mass relative to the aqueous emulsion,
the emulsifying agent is present in a total amount of 2% to 10% by mass relative to the aqueous emulsion, and
wherein heating is to 10° to 25° C. above the melting point of the polyolefin having a weight-average molecular weight of 20,000 or higher.

8. The process for producing the aqueous emulsion as claimed in claim 2, wherein:
the polyolefin having a weight-average molecular weight of 20,000 or higher has a weight-average molecular weight of 20,000 to 150,000, is a polypropylene or a modified polypropylene and is present in an amount of 15% to 50% by mass relative to the aqueous emulsion, the low molecular weight polypropylene modified with an acid and having a weight-average molecular weight of 1,000 to 20,000 is present in an amount of 2% to 8% by mass relative to the aqueous emulsion, the styrene/maleic anhydride copolymer is present in an amount of 0.3% to 10% by mass relative to the aqueous emulsion or/and the ester of a styrene/maleic acid copolymer is present in an amount of 0.5% to 15% by mass relative to the aqueous emulsion, and wherein heating is to 10° to 25° C. above the melting point of the polyolefin having a weight-average molecular weight of 20,000 or higher.

9. The process for producing the aqueous emulsion as claimed in claim 2, wherein:

the polyolefin having a weight-average molecular weight of 20,000 or higher is a polypropylene or a modified polypropylene, has a weight-average molecular weight of 50,000 to 150,000 and is present in an amount of 20% to 40% by mass relative to the aqueous emulsion, the low molecular weight polypropylene modified with an acid and having a weight-average molecular weight of 1,000 to 20,000 is present in an amount of 2% to 8% by mass relative to the aqueous emulsion, the styrene/maleic anhydride copolymer is present in an amount of 1% to 5% by mass relative to the aqueous emulsion or/and the ester of a styrene/maleic acid copolymer is present in an amount of 0.75% to 10% by mass relative to the aqueous emulsion, the emulsifying agent is present in a total amount of 2% to 10% by mass relative to the aqueous emulsion, and wherein heating is to 10° to 25° C. above the melting point of the polyolefin having a weight-average molecular weight of 20,000 or higher.

10. An aqueous emulsion consisting essentially of a polyolefin having a weight-average molecular weight of 20,000 or higher in an amount of about 10 to 60% by mass relative to the aqueous emulsion, a low molecular weight polypropylene modified with an acid and having a weight-average molecular weight of 1,000 to 20,000, a styrene/maleic anhydride copolymer in an amount of about 0.1 to 15% by mass relative to the aqueous emulsion or/and an ester of a styrene/maleic acid copolymer in an amount of about 0.2 to 20% by mass relative to the aqueous emulsion, and water.

11. A coating liquid comprising the aqueous emulsion as defined in claim 10.

12. The coating liquid as claimed in claim 11, which is a sizing agent for glass fibers.

13. A coating liquid comprising the aqueous emulsion as defined in claim 10.

14. The coating liquid as claimed in claim 13, which is a sizing agent for glass fibers.

15. The aqueous emulsion as claimed in claim 10, wherein the polyolefin is a polypropylene or a modified polypropylene.

16. The aqueous emulsion as claimed in claim 10, wherein:

the polyolefin having a weight-average molecular weight of 20,000 or higher has a weight-average molecular weight of 20,000 to 150,000, is a polypropylene or a modified polypropylene and is present in an amount of 15% to 50% by mass relative to the aqueous emulsion, the low molecular weight polypropylene modified with an acid and having a weight-average molecular weight of 1,000 to 20,000 is present in an amount of 2% to 8% by mass relative to the aqueous emulsion, and the styrene/maleic anhydride copolymer is present in an amount of 0.3% to 10% by mass relative to the aqueous emulsion or/and the ester of a styrene/maleic acid copolymer is present in an amount of 0.5% to 15% by mass relative to the aqueous emulsion.

17. The aqueous emulsion as claimed in claim 10, wherein:

the polyolefin having a weight-average molecular weight of 20,000 or higher is a polypropylene or a modified polypropylene, has a weight-average molecular weight of 50,000 to 150,000 and is present in an amount of 20% to 40% by mass relative to the aqueous emulsion, the low molecular weight polypropylene modified with an acid and having a weight-average molecular weight of 1,000 to 20,000 is present in an amount of 2% to 8% by mass relative to the aqueous emulsion, the styrene/maleic anhydride copolymer is present in an amount of 1% to 5% by mass relative to the aqueous emulsion or/and the ester of a styrene/maleic acid copolymer is present in an amount of 0.75% to 10% by mass relative to the aqueous emulsion, and the emulsifying agent is present in a total amount of 2% to 10% by mass relative to the aqueous emulsion.

* * * * *